C. Crook.
Mower.

No. 3394 Reissued Apr. 20, 1869.

C. Crook.

Mower.

No 3394 Reissued Apr. 20, 1869.

UNITED STATES PATENT OFFICE.

JAMES I. HENDRYX, OF COOPERSTOWN, NEW YORK, ASSIGNEE, BY MESNE ASSIGNMENTS, OF CHARLES CROOK.

IMPROVEMENT IN HARVESTERS.

Specification forming part of Letters Patent No. 17,205, dated May 5, 1857; reissue No. 548, dated May 4, 1858; reissue No. 3,394, dated April 20, 1869.

DIVISION B.

*To all whom it may concern:*

Be it known that CHARLES CROOK, of New Hope, Bucks county, State of Pennsylvania, invented certain new and useful Improvements in Mowing and Reaping Machines, of which the following is a full, clear, and exact description, reference being had to the accompanying drawing and to the letters of reference marked thereon, in which—

Figure 1:
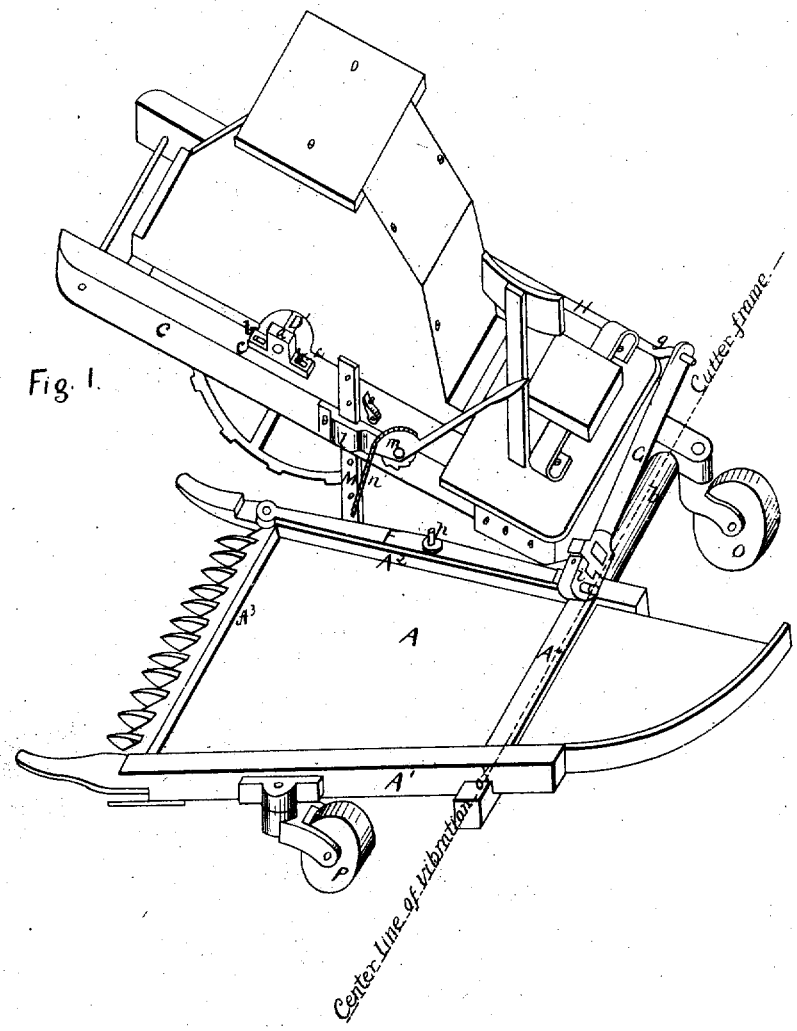
Figure 5:
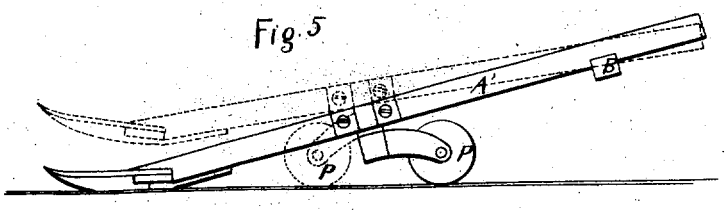
Figure 2:
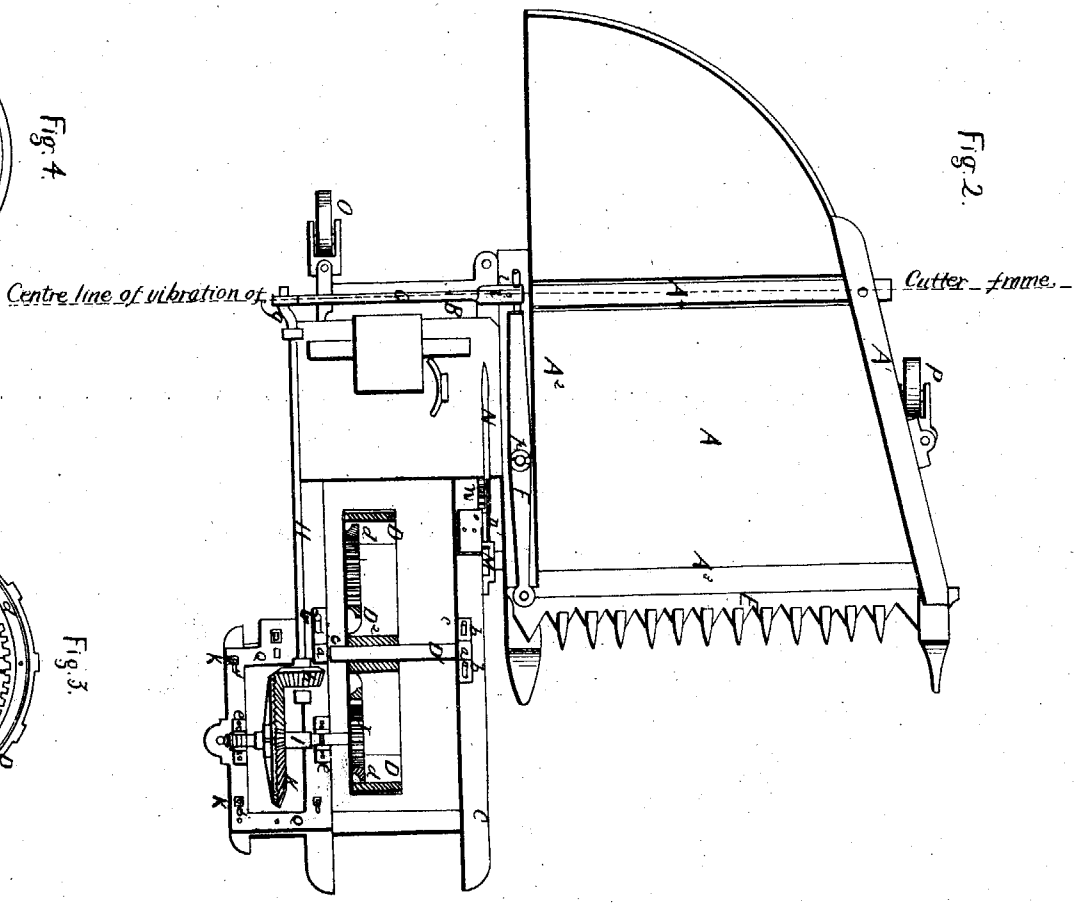
Figure 4:
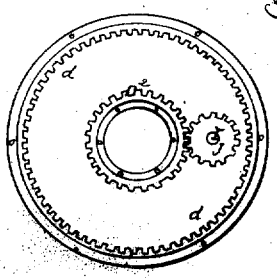
Figure 3:
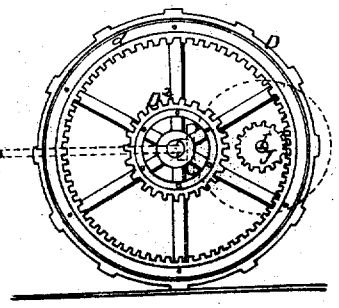

Figure 1 is a perspective view of a mowing and reaping machine, illustrating the improvements; Fig. 2, a ground plan with part of the gearing in section; Figs. 3 and 4, views of the driving-gear; Fig. 5, an end view of the grain side of the cutter-frame.

Similar letters refer to similar parts through the several views.

The invention embraced in this application relates to the means for raising and lowering the cutting apparatus.

A represents the platform, attached to the cutter-frame, which is composed of the outside bar $A^1$, the inside bar $A^2$, the front bar $A^3$, and the back bar $A^4$. A rounded continuation, B, of the latter, and with it the whole cutter-frame, turns in brackets on the main frame C of the machine. D is the main driving-wheel, secured to the shaft $D^1$, which turns in boxes *a a*. These boxes have oblong slots *c c*, through which bolts or screws pass into the main frame, so that the boxes, and with them the shaft $D^1$ and its driving-wheel D, may be adjusted at pleasure. To the driving-wheel are secured the gear-wheels *d* and $D^2$, both having teeth adapted to gear into those of the pinion J, which is secured to the end of the shaft I, the latter turning in boxes *e e*, attached to a plate, Q, which is secured to the main frame.

This plate may be made adjustable by allowing the screws or bolts *k* to pass through oblong slots *j*. It is not necessary, however, that both the boxes *a a* and the plate Q, with its boxes *e e*, should be adjustable. Either one or the other may be permanently secured to the main frame.

On the shaft I is a bevel-wheel, K, gearing into the bevel-pinion *h* on the shaft H, which turns in brackets on the main frame, and the end of which is formed into a crank, *g*. To the latter is connected one end of the rod G, the opposite end being connected, by means of a swivel-joint, *i*, to one arm of the lever F, which has its fulcrum on a pin, *p*, attached to the inside bar $A^2$ of the cutter-frame, the opposite end of the lever being pivoted to the cutter-bar E. A caster, O, supports the rear of the main frame, and the outer end of the cutter-frame is supported on the caster P. To the inside bar $A^2$ of the cutter-frame, and between the center of vibration of the latter and the cutters, is jointed the bar M, which passes through and is guided by the staple *l* on the main frame. A lever, N, has its fulcrum on a pin attached to the main frame, and to this lever are secured the segment *m* of a pulley and the ratchet-wheel *n*. To the former is attached the cord or chain *n'*, the lower end of which is connected to the bar M, and the teeth of the ratchet-wheel are adapted to the pawl *o*, which is hinged to the main frame, and which serves to retain the cutter-frame in the position to which it may have been raised by the lever N.

The outer end of the swivel-joint *i* turns on the rounded end of the arm of the lever F, and as the inner end of the joint is allowed to turn freely on the end of the connecting-rod G, and as the latter is in close proximity to the center line of vibration of the cutter-frame, it is evident that the cutters may be raised and lowered at pleasure, without disarranging the proper working position of either the rods or the lever, or causing any interruption in the operation of the machine.

What is claimed under this application as the invention of CHARLES CROOK is—

1. A lifting segment or cam, with lever and chain or cord attached thereto, for raising and lowering the cutting apparatus.

2. A lifting segment or cam, with lever and chain, in combination with ratcheted teeth and a pawl or its equivalent, for holding the cutting apparatus at any desired height.

JAMES I. HENDRYX.

Witnesses:

C. W. SMITH,

ASAHEL A. JARVIS.